(12) United States Patent
Grant

(10) Patent No.: US 6,302,630 B1
(45) Date of Patent: Oct. 16, 2001

(54) FASTENER WITH RECESSED HEAD AND HEAD INSERT

(75) Inventor: William S. Grant, Azle, TX (US)

(73) Assignee: Lockheed Martin, Bethesda, MD (US)

( * ) Notice: Subject to any disclaimer, the term of this patent is extended or adjusted under 35 U.S.C. 154(b) by 0 days.

(21) Appl. No.: 09/550,993

(22) Filed: Apr. 18, 2000

(51) Int. Cl.[7] .................................................... A47G 3/00
(52) U.S. Cl. ...................... 411/372.6; 411/377; 411/403; 411/510
(58) Field of Search .............................. 411/372.5, 372.6, 411/373, 374, 377, 431, 403, 399, 508–510

(56) References Cited

U.S. PATENT DOCUMENTS

| | | | |
|---|---|---|---|
| 2,627,778 | * | 2/1953 | Hodell . |
| 3,405,595 | * | 10/1968 | Peterson . |
| 3,885,492 | * | 5/1975 | Gutshall . |
| 4,452,556 | * | 6/1984 | Nelson . |
| 4,884,929 | * | 12/1989 | Smith . |
| 5,391,028 | * | 2/1995 | Charles . |
| 5,536,124 | * | 7/1996 | Silva . |
| 5,603,472 | * | 2/1997 | Hutter . |
| 5,795,116 | * | 8/1998 | Frank . |

* cited by examiner

Primary Examiner—Flemming Saether
(74) Attorney, Agent, or Firm—Jackson Walker LLP

(57) ABSTRACT

A fastening device (10) including a fastener (20) and a recess insert (12) retained within the head (21) of the fastener (20). The fastener has a head (21) at one end and a threaded shaft (25) at the opposing end. The fastener head (21) has an engagement recess (22) and a concentric counter-bored section (28). The counter-bored section (28) has a greater diameter than the diameter of the engagement recess (22) and extends into the fastener head (21) less than the depth of the engagement recess. The counter-bored section includes an insert retainer (24). The recess insert (12) comprises a different material than the fastener (20). The insert (12) has a fastener retainer (18) and is adapted to fit within the fastener head (21) counter-bored section (28). The insert (12) has a head (13) with an aperture (14) for permitting access to the fastener engagement recess (22) therethrough.

19 Claims, 2 Drawing Sheets

FASTENER WITH RECESSED HEAD AND HEAD INSERT

TECHNICAL FIELD OF THE INVENTION

The present invention is generally related to mechanical fasteners, and more particularly to fasteners for low radar signature or stealth aircraft, vehicles and weapons.

BACKGROUND OF THE INVENTION

Military aircraft and vehicles such as tanks and ships typically have access panels that are attached with fasteners. Nuts may be permanently affixed to interior panels, for example, to receive the threaded shaft of the fasteners. In many military applications, detection of the vehicle by radar is undesirable, and an effort has been made to design aircraft, ships and land vehicles, with substantially smooth exterior contours which may be coated with special films to reduce radar signatures and thus inhibit detection.

A problem with stealth aircraft and vehicles is that the presence of screws and other fasteners on the exterior surface contributes to the radar signature. Typically a recessed screw head is used to install doors and panels. This involves countersinking the hole in the surface the screw enters and using a chamfered screw head to fit within the countersunk hole so that the head of the screw is flush with the surface. However, even the use of recessed screws is detectable in the signature of the vehicle.

The recessed exterior screws and fasteners on stealth aircraft and vehicles must be covered to reduce the radar signature. Special coatings are typically used to decrease radar detection of a vehicle. When applied to the fasteners, the coatings fill in the driving engagement mechanisms, and thus the fasteners are not easily accessible by service personnel when needed for repair or maintenance. The head and recess of the fastener must then be scraped to remove the debris, which is time-consuming.

One prior art method involves using an aero-smoothing caulk to cover the heads of fasteners to decrease radar detection. The aero-smoothing caulk must be removed prior to accessing the fastener, and then must be reinstalled following maintenance. This is disadvantageous because the caulk or putty is difficult and time-consuming to remove. Another prior art solution involves bonding donut-shaped plastic attachments on the surface of the fastener heads. This method creates an expensive fastener that is easily damaged and must therefore be replaced frequently.

What is needed is a fastening device for stealth aircraft, vehicles and weapons absent these problems of the prior art.

SUMMARY OF THE INVENTION

The present invention achieves technical advantages as a fastener with a recessed insert that fits within and is retained by the fastener head. The insert covers the fastener head to reduce the signature of the aircraft or vehicle. The engagement portion of the fastener head recess may be accessed through an aperture in the insert to allow removing and installing the fasteners. The insert is easily snapped in and out of the fastener head, requiring no special tools to install or replace the inserts.

In one embodiment, disclosed is a fastening device with a recessed insert. The fastener has a head at one end and a threaded shaft at the opposing end. The fastener head includes a recessed engagement portion and a concentric counter-bored section thereabout. The counter-bored section has a greater diameter than the engagement portion and extends into the fastener head less than the depth of the engagement recess. The counter-bored section securely receives the insert. The insert is made of a different material than the fastener and has a retainer mechanism such as threads adapted to secure to the counterbored section of the fastener head. The head of the insert advantageously has a circular opening in the center thereof for permitting insertion of the fastener activation tool.

Also disclosed is an insert for a fastener having a recessed fastener engagement portion, preferably being a concentric counter-bored section. The fastener counter-bored section has a greater diameter than the recess and extends into the fastener head less than the engagement recess. The insert includes a hollow shaft adapted to be securely retained within the fastener counter-bored section, and has a head coupled to the shaft. The insert head has a circular opening in the center thereof for permitting access to the fastener engagement portion therethrough.

Further disclosed is a method of reducing the radar signature of a vehicle, including the steps of installing one or more fasteners on the exterior surface of the vehicle, the fasteners having a head comprising an engagement recess preferably comprising a larger concentric counter-bored section. The method also includes the step of installing an insert into the fastener counter-bored section. The insert has a head with a diameter substantially equal to the diameter of the fastener head. The insert head has an aperture for permitting access to the fastener engagement recess and is made of a different material than the fastener.

Advantages of the invention include reducing the radar signature of an aircraft or vehicle. The fastening device may be removed and installed via the aperture in the insert without removing the insert, resulting in cost and labor savings. The insert is easily snapped into place within the fastener recess using finger pressure. Special tools, materials or adhesives are not needed for installation or removal of the insert, as in prior art methods. If damaged, the insert is easily removed and replaced without replacement of the fastener. The recessed insert allows quick restoration of aircraft surface integrity after maintenance.

BRIEF DESCRIPTION OF THE DRAWINGS

In the drawings, which form an integral part of the specification and are to be read in conjunction therewith.

Like numerals and symbols are employed in different figures to designate similar components in various views unless otherwise indicated.

DETAILED DESCRIPTION OF PREFERRED EMBODIMENTS

The present invention achieves technical advantages as a fastening device having a radar signature-reducing insert engaged within the head of a fastener. The insert has a small aperture allowing access to an engagement recess of the fastener, so the fastening device may be easily and quickly removed and installed without requiring the removal of the insert, e.g. the insert is integral to the fastener.

Figure 1:
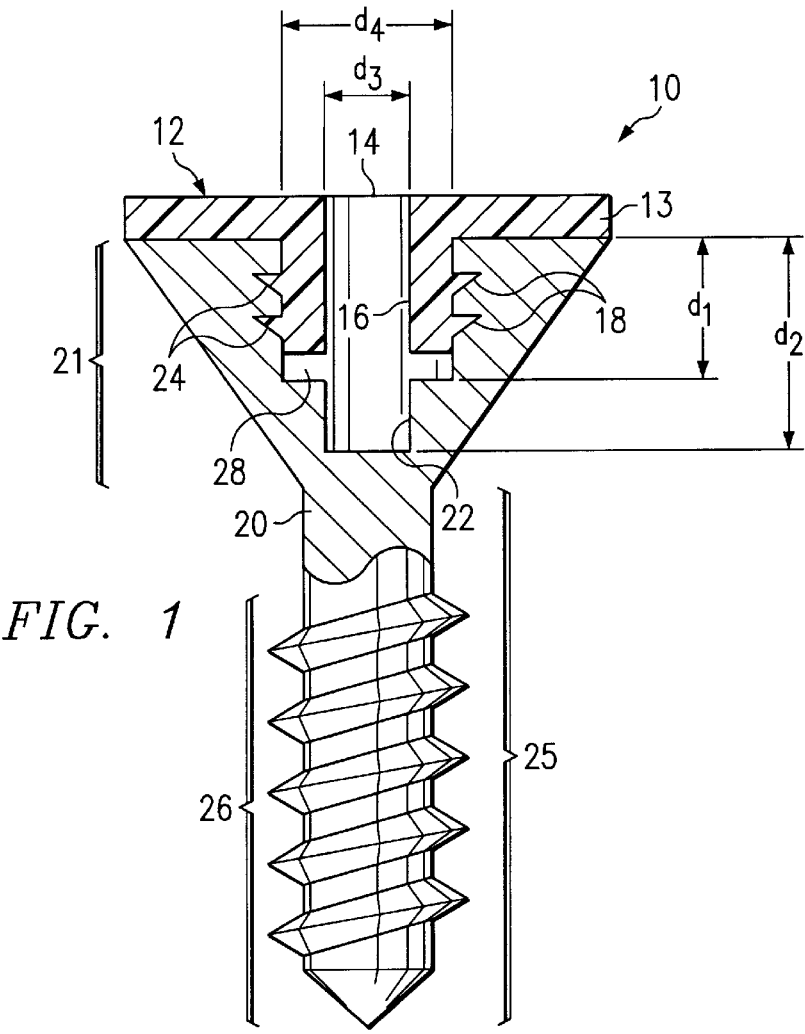
FIG. 1 is a cross-section of the fastening device of the present invention having an insert adapted to fit within a fastener recess comprising a counter-bored section.

A first embodiment of the fastening device of the present invention is shown generally at 10 in FIG. 1. The fastening device 10 comprises a fastener 20 having a fastener head 21 adapted to selectively receive and retain an insert 12, where the insert 12 comprises a material less visible in a radar signature than metal, such as an absorber. The insert 12 is preferably relatively pliable for easy insertion into a recess 28 of the fastener head 21. The insert 12 has a head 13 preferably having substantially the same diameter as the fastener head 21. The insert 12 comprises an opening 14 defining a hollowed shaft 16, the shaft 16 having an annular exterior fastener retainer 18 preferably comprising a male retainer formed of annular ribs. The fastener head 21 comprises a corresponding insert retainer 24 adapted to securely receive and engage the insert fastener retainer 18. FIG. 1 illustrates a fastener female retainer 24 comprising two annular grooves retainably coupled to insert male retainer 18 comprising two annular ribs positioned along the exterior of the insert shaft 16.

The fastener 20 has a head 21 at one end and has a threaded shaft 25 at the other opposing end. Threads 26 may be located along the shaft 25 and are spaced a distance apart in a spiral, for example. The fastener head 21 comprises an opening having two parts: 1) an engagement recess 22 for engaging a driver bit inserted therein (see FIG. 4) to remove and install the fastening device 10, and 2) a larger counter-bored section 28 for containing and retaining the insert 12. The counter-bored section 28 extends into the fastener head 21 a distance of $d_1$, and the engagement recess 22 extends into the fastener head a distance of $d_2$, where $d_1 < d_2$. Distance $d_1$, may be, for example, ⅛" to 3/16". The engagement recess 22 is preferably hexagonal or Torx (a six-pointed star shape common in the art) shaped, but alternatively may be designed to fit a Phillips or flat-head screwdriver, for example. The counter-bored section 28 is concentric with the engagement recess 22 and preferably comprises a larger diameter $d_4$ than the diameter $d_3$ of the engagement recess 22, in order to accommodate the insert 12.

Figure 2:
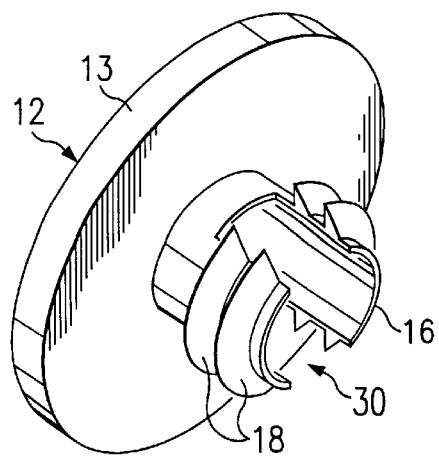
FIG. 2 is a rear perspective view of the insert of the present invention having ribs along the shaft for securely retaining the insert in the fastener in a snap-fit arrangement.

A perspective view of the insert 12 as seen from below is shown in FIG. 2. The insert hollow shaft 16 preferably comprises one or more ribs 18 on the exterior thereof for engaging with the corresponding grooves 24 of the fastener 20. The number of ribs is determined by design parameters such as the depth of the fastener head 21 and the type of material used for the insert 12, for example. Two ribs are shown in FIG. 1, whereas three ribs are shown in FIG. 2. Optional spaced longitudinal slots 30 may be formed in the insert shaft 16 as shown to allow the shaft 16 to flex and contort inwardly as the insert 12 is pushed into the fastener 20. The shaft 16 is resilient and expands and springs back into the original shape as the insert ribs 18 engage with the fastener grooves 24 to retain the insert 12. In an alternative embodiment, shaft 16 could be provided with detents that correspond to ribs defined in recess 22, and thus functional equivalents to the physical attributes shown are intended to be covered by the present invention. For instance, insert 12 could be threaded and screwed into a threaded recess 22.

Figure 3:
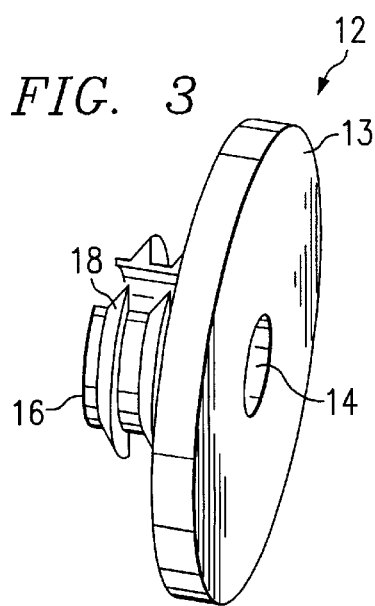
FIG. 3 is a front perspective view of the insert having an aperture for permitting access to the fastener engagement recess.
Figure 4:
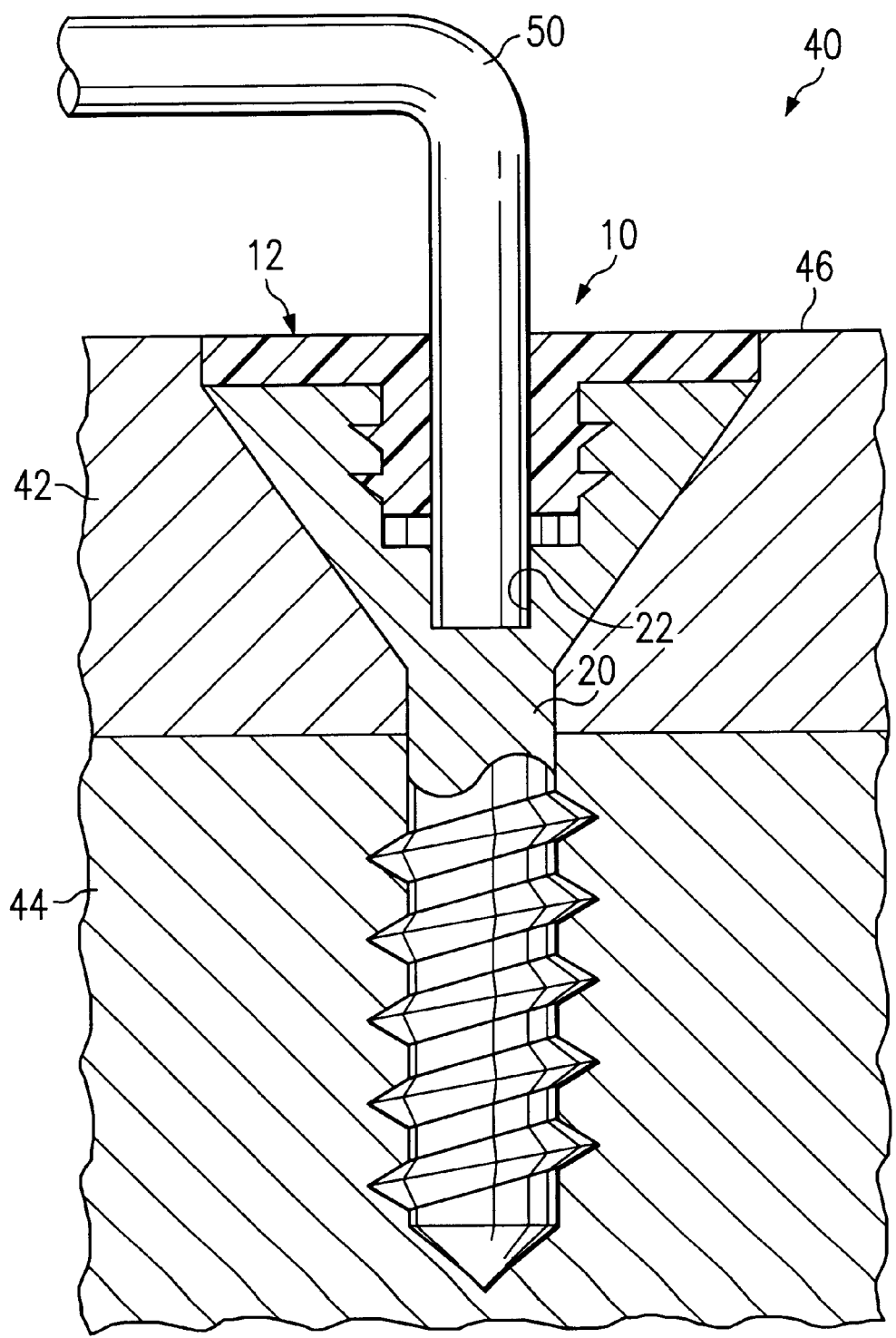
FIG. 4 illustrates a driving bit being used to access the fastener engagement recess of the present invention through the insert head aperture.

A perspective frontal view of the insert 12 is shown in FIG. 3. The insert head 13 comprises aperture 14 of sufficient diameter to allow insertion of a driving bit for engaging the engagement recess 22 of the fastener 20, as shown in FIG. 4. The aperture 14 is sufficiently small to reduce the radar signature of the insert 12. The insert aperture 14 permits the removal or installation of the fastening device 10 without requiring the removal of the insert 12 e.g. the insert 12 is coupled to the fastener 20. This is advantageous over prior art methods that require removal of putty or plastic donuts, for example, in order to access the driving mechanism of the fasteners. The insert 12 shown in FIG. 3 is depicted as having only one rib 18 on the shaft 16. A single annular rib 18 may provide sufficient mechanical retention of the insert 12 into the fastener 20, depending on the design parameters and application.

Preferably, the fastener 20 comprises a rigid material such as stainless steel or titanium, and the insert 12 comprises a resilient absorber material for reducing the radar signature. The insert 12 preferably is molded from a thermoplastic material such as Nylon 12, for example. However, various composite and metallic materials, and various absorber materials may be used for the fastener 20 and insert 12 in accordance with the present invention.

FIG. 4 illustrates the fastening device 10 of the present invention installed in a portion 40 of an aircraft or vehicle, for example. The fastening device 10 is preferably recessed into an outer member 42 of the vehicle, the outer member being countersunk or chamfered to correspond to and accommodate the fastening device 10. The top surface of the insert head 13 preferably mounts flush with an exterior surface 46 of the outer member 42 as shown. The fastening device 10 fastens the outer member 42 to an interior member 44, which fastening may be further accomplished with the use of nuts and/or other mechanical devices, not shown. A driving bit 50 may be inserted into the insert aperture 14 to engage the engagement recess 22 of the fastener 20, as shown. The driving bit 50 may comprise a hex tool such as an Allen wrench, a Torx tool or other driving bit 50 appropriate for the shape of the fastener 20 engagement recess 22 to achieve rotation thereof The fastening device 10 disclosed and described herein provides several advantages over prior art fasteners and methods. Use of the fastening device 10 results in a reduced radar signature of an aircraft or vehicle by providing surface smoothness of the fastener head into an aircraft skin. The insert aperture 22 allows removal and installation of the fastening device 10 without requiring the removal of the insert 12, resulting in labor savings. The insert 12 is simple to insert by hand by snapping into place within the fastener 20, and does not require any special tools, materials or adhesives to install, as in prior art methods. If damaged, the insert 12 is easily removed by prying with an object inserted in the insert aperture 22, for example, the driving bit 50 may be used to remove the insert 12 by inserting the bit 50 only into the counter-bored section 28, and pulling outward to pop the insert 12 out. Replacement of the fastener 20 is not required, which is sometimes a problem in the prior art if the putty or film clogs access to the engagement means of prior art fasteners.

While the invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, while the fastening device 10 of the present invention has been described with a male engagement means on the insert shaft 16 and a corresponding female engagement means within the counter-bored section 28 of the fastener 20, conversely, a female engagement means on the insert 12 and a corresponding male engagement means within the fastener 20 may be utilized. The fastening device 10 preferably has a recessed head 21 as shown in FIGS. 1 and 4, although other head 21 configurations may be utilized. The present fastener and insert design is useful for any length and size of fastener. It is therefore intended that the appended claims encompass any such modifications or embodiments.

What is claimed is:

1. A fastening device, comprising:

a fastener having a head at one, said head having an engagement recess extending into said fastener head; and an insert comprising a different material than said fastener, said insert having a fastener retainer to secure and fit within said fastener head recess, said insert having a head with an aperture permitting direct engagement with said fastener head engagement recess therethrough for providing rotational force to said fastener; and wherein said diameter of said insert head is substantially equal to said diameter of said fastener head.

2. The fastening device according to claim 1 wherein said head engagement recess comprises a counter-bored section insert retainer comprising a female retainer, wherein said insert fastener retainer comprises a male retainer, and wherein said fastener female retainer engages with said insert male retainer to retain said insert within said fastener.

3. The fastening device according to claim 2 wherein said fastener counter-bored section has an interior cylindrical surface including said insert female retainer, said insert female retainer comprising at least one annular groove, wherein said insert comprises a hollow shaft having an exterior cylindrical surface including said fastener male retainer, said fastener male retainer comprising at least one annular rib, wherein said insert shaft rib engages with said counter-bored section groove to retain said insert within said fastener.

4. The fastening device according to claim 3 wherein said insert shaft comprises a plurality of ribs and said counter-bored section comprises a plurality of corresponding grooves.

5. The fastening device according to claim 1 wherein said insert has an insert shaft comprising at least one slot parallel to the fastener shaft.

6. The fastening device according to claim 1 wherein said fastener head comprises chamfered walls adapted to fit flush within a counter-bored surface.

7. The fastening device according to claim 1 wherein said insert comprises a material inhibiting a reflection of a radar signal.

8. The fastening device according to claim 7 wherein said insert comprises Nylon-12 material.

9. The fastening device according to claim 1 wherein said insert comprises a pliable material so that said insert is hand press-fittable into said fastener.

10. An insert for a fastener having a head at one end, said fastener head having an engagement recess extending into said fastener head, said insert comprising:

a hollow shaft adapted to be retained within said fastener engagement recess; and a head coupled to said shaft and having an aperture for permitting direct engagement with said fastener head engagement recess therethrough for providing rotational force to said fastener; and wherein said insert comprises a substantially pliable material inhibiting reflection of a radar signal, whereby said insert is hand-insertable into said fastener.

11. The insert according to claim 10 wherein said insert hollow shaft includes a fastener retainer.

12. The insert according to claim 10 wherein said insert hollow shaft comprises at least one slot.

13. The insert according to claim 10 wherein the diameter of said insert head is adapted to be substantially equal to the diameter of said fastener head.

14. The insert according to claim 10 wherein said insert comprises Nylon-12 material.

15. A method of improving the radar signature of a vehicle, comprising the steps of:

installing one or more fasteners on the exterior surface of said vehicle, said fasteners having a head comprising an engagement recess; and installing an insert into each fastener engagement recess, said insert contained and retained by said fastener engagement recess providing rotational force to said fastener, said insert head having an aperture for accessing said fastener engagement recess; and wherein said accessing includes inserting a driving bit, through said aperture, to securingly engage with said fastener engagement recess.

16. The method according to claim 15 wherein said step of installing an insert comprises installing said insert by hand.

17. The method according to claim 15 wherein said fastener may be removed and reinstalled by inserting said driving bit into said insert aperture to securingly engage said fastener engagement recess.

18. The method according to claim 15 wherein said insert is removable and replaceable.

19. The method according to claim 15 wherein said insert comprises a material inhibiting reflection of a radar signal.

* * * * *